(12) United States Patent
Ayadurai et al.

(10) Patent No.: US 11,218,910 B2
(45) Date of Patent: Jan. 4, 2022

(54) FIRST NODE AND A SECOND NODE AND METHODS OF OPERATING THE SAME

(71) Applicant: Telefonaktiebolaget LM Ericsson (publ), Stockholm (SE)

(72) Inventors: Vicknesan Ayadurai, Sollentuna (SE); David Nophut, Dresden (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/768,483

(22) PCT Filed: Dec. 4, 2017

(86) PCT No.: PCT/SE2017/051206
§ 371 (c)(1),
(2) Date: May 29, 2020

(87) PCT Pub. No.: WO2019/112494
PCT Pub. Date: Jun. 13, 2019

(65) Prior Publication Data
US 2021/0176666 A1 Jun. 10, 2021

(51) Int. Cl.
*H04W 28/08* (2009.01)
*H04L 12/709* (2013.01)
(Continued)

(52) U.S. Cl.
CPC ....... *H04W 28/0958* (2020.05); *H04L 45/245* (2013.01); *H04L 47/41* (2013.01); *H04W 28/0268* (2013.01)

(58) Field of Classification Search
CPC ..... H04W 28/02; H04W 28/06; H04W 28/08; H04W 28/0942; H04W 28/0958;
(Continued)

(56) References Cited

U.S. PATENT DOCUMENTS 6,498,781 B1 * 12/2002 Bass .................. H04L 41/5025
370/230.1
6,952,401 B1 * 10/2005 Kadambi .............. H04L 47/125
370/232
(Continued)

FOREIGN PATENT DOCUMENTS

EP 2814297 A1 12/2014
WO 2014051513 A1 4/2014

OTHER PUBLICATIONS

International Search Report and Written Opinion for International Application No. PCT/SE2017/051206, dated Nov. 7, 2018, 16 pages.
(Continued)

*Primary Examiner* — Kevin D Mew
(74) *Attorney, Agent, or Firm* — NDWE LLP

(57) ABSTRACT

A first node for use in a telecommunications network. The first node is adapted to acquire an indication of a performance associated with sending traffic through an aggregation of a first link and a second link and send the traffic through one of: the first link, the second link, and an aggregation of the first link and the second link, based on the indication. There is further a second node adapted to determine an indication of a performance associated with a first node sending traffic through an aggregation of a first link and a second link, and send a signal to the first node, based on the indication.

18 Claims, 14 Drawing Sheets

(51) Int. Cl.
*H04L 12/891* (2013.01)
*H04W 28/02* (2009.01)

(58) Field of Classification Search
CPC .. H04W 28/0268; H04L 45/22; H04L 45/245; H04L 47/10; H04L 47/41
See application file for complete search history.

(56) References Cited

U.S. PATENT DOCUMENTS

| | | | | |
|---|---|---|---|---|
| 7,539,175 B2* | 5/2009 | White | ........... | H04W 88/06 370/350 |
| 7,936,770 B1* | 5/2011 | Frattura | ........... | H04L 49/90 370/412 |
| 8,437,262 B2* | 5/2013 | Kotrla | ........... | H04L 45/245 370/242 |
| 8,634,417 B2* | 1/2014 | Assarpour | ........... | H04L 43/0817 370/389 |
| 9,059,817 B2* | 6/2015 | Huang | ........... | H04L 1/0009 |
| 9,313,122 B2* | 4/2016 | Miyabe | ........... | H04L 43/0852 |
| 9,847,925 B2* | 12/2017 | Mizrahi | ........... | H04L 43/0876 |
| 2008/0291826 A1* | 11/2008 | Licardie | ........... | H04L 47/41 370/230 |
| 2013/0021968 A1* | 1/2013 | Reznik | ........... | H04L 45/245 370/328 |
| 2014/0016470 A1* | 1/2014 | Li | ........... | H04L 47/125 370/235 |
| 2014/0029527 A1* | 1/2014 | Okuda | ........... | H04W 72/085 370/329 |
| 2014/0126511 A1* | 5/2014 | Okazaki | ........... | H04L 45/245 370/329 |
| 2014/0169183 A1* | 6/2014 | Allan | ........... | H04L 41/12 370/248 |
| 2015/0003465 A1* | 1/2015 | Saavedra | ........... | H04L 47/828 370/401 |
| 2015/0103673 A1* | 4/2015 | Shimada | ........... | H04L 43/0811 370/241.1 |
| 2016/0028472 A1* | 1/2016 | Valencia | ........... | H04B 7/18513 370/316 |
| 2016/0072669 A1* | 3/2016 | Saavedra | ........... | H04L 45/245 709/220 |
| 2016/0156516 A1* | 6/2016 | Nishi | ........... | H04L 43/0811 370/329 |
| 2016/0315808 A1* | 10/2016 | Saavedra | ........... | H04L 67/42 |
| 2017/0127408 A1* | 5/2017 | Du | ........... | H04W 24/08 |
| 2017/0230197 A1* | 8/2017 | Zhang | ........... | H04L 45/64 |
| 2017/0302568 A1* | 10/2017 | Meng | ........... | H04L 29/06 |
| 2018/0019942 A1* | 1/2018 | Liang | ........... | H04L 45/30 |
| 2018/0368047 A1* | 12/2018 | Patil | ........... | H04L 45/38 |

OTHER PUBLICATIONS

International Preliminary Report on Patentability for International Application No. PCT/SE2017/051206, dated Jun. 18, 2020, 12 pages.
Communication pursuant to Article 94(3) EPC for EP Application No. 17823240.1, dated Jun. 15, 2021, 4 pages.

* cited by examiner

FIRST NODE AND A SECOND NODE AND METHODS OF OPERATING THE SAME

CROSS-REFERENCE TO RELATED APPLICATIONS

This application is a National stage of International Application No. PCT/SE2017/051206, filed Dec. 4, 2017, which is hereby incorporated by reference.

TECHNICAL FIELD

Embodiments herein relate to first and second nodes in a telecommunications network and methods of operating such nodes.

INTRODUCTION

Modern day communications devices often have multiple access links (e.g. LTE, wired links, wi-fi) to a telecommunications network.

There are numerous mechanisms that try to exploit using these separate links in the best way possible for the required traffic. One means involves identifying the type of traffic being generated, and subsequently placing that particular traffic flow on a "suitable" link.

Another approach is to divide each individual traffic flow across the available links to use all available links simultaneously, e.g. via link aggregation. By doing so, the traffic flow would then experience an aggregated throughput of the individual links, potentially increasing its performance.

Aggregation of traffic across multiple links is already used in modern communications networks. For example, smartphones may utilize cellular as well as wi-fi interfaces simultaneously. In the home environment, there are customer-premise equipment (CPE) devices that aggregate traffic on cellular as well as fixed wired connections such as asymmetric digital subscriber line (ADSL) or fiber links simultaneously. The latter is often referred to as "Hybrid-access" or "Fixed-mobile convergence" scenarios.

There is therefore a need for solutions that improve traffic management over multiple links in a telecommunications network.

SUMMARY

Intuitively, aggregated solutions should result in better data throughput compared to single link solutions. However, the multipath scheduler that co-ordinates such aggregation is a complicated mechanism. It needs to decide how to distribute data on the individual links such that they arrive at the destination via the two paths, preferably in-order. This challenge is increased significantly when the individual links exhibit differing characteristics in terms of delays, jitter and packet losses, for example.

It has been recognised by the inventors herein that factors such as delays, jitter and packet losses on a first link may adversely affect the performance of an aggregation of a first link and a second link. Under certain conditions it is conceivable that the combined multipath throughput could drop to that of a single one of the first or second link throughputs (e.g. providing no advantage to the aggregation compared to using one or other of the first and second links separately), or under adverse conditions, decrease to even less than that of a single link, for example, if the transmission of packets is delayed due to earlier packets being outstanding or lost when sent over a poorly performing link. Such lost packets then need to be retransmitted so as to ensure lossless in-order delivery of the overall packet sequence (e.g. resulting in an inferior performance compared to using one of the first and second links individually). In these situations it would therefore be better to use only a single (e.g. best) link for sending the traffic through the telecommunications network.

According to a first aspect, there is a first node for use in a telecommunications network. The first node is adapted to acquire an indication of a performance associated with sending traffic through an aggregation of a first link and a second link. The first node is further adapted to send the traffic through one of: the first link; the second link; and an aggregation of the first link and the second link; based on the indication.

By adapting the first node to acquire an indication of a performance associated with sending the traffic through an aggregation of the first and second links before the traffic is sent, the first node is able to dynamically determine whether traffic would be more efficiently sent across the first link, the second link or an aggregation of the first and second links. In this way, the first node is able to send the traffic through the link (or aggregation of links) with the highest performance, leading to better performance outcomes for the end-user. Furthermore, the solutions herein may facilitate improved network operation for operators operating multiple links. For example, the solutions herein may improve network utilisation, for example, by sending low load traffic mainly on "cheaper" links and only using more "expensive" links as an overflow mechanism. In other embodiments, an operator may avoid using radio links when conditions are bad if it is determined that it will bring no perceivable gain. Instead, the network may assign the radio resources to a better placed wireless user.

According to a second aspect, there is a second node. The second node is adapted to determine an indication of a performance associated with a first node sending traffic through an aggregation of a first link and a second link and send a signal to the first node, based on the indication.

In this way, the second node determines the indication of a performance associated with the first node sending traffic through an aggregation of a first link and a second link. The second node sends a signal to the first node, based on the indication. In this way, the second node is able to influence the first node (e.g. by providing an instruction or information relating to the indication) to send traffic through the link (or aggregation of links) with the highest performance, leading to better performance outcomes for the end-user. The second node described herein therefore provides a means of providing information on the gain or benefit associated with aggregating traffic through two or more links (e.g. using multiple paths) under different link conditions.

According to a third aspect there is a method in a first node for use in a telecommunications network. The method comprises acquiring an indication of a performance associated with sending traffic through an aggregation of a first link and a second link, and sending the traffic through one of: the first link; the second link; and an aggregation of the first link and the second link, based on the indication.

According to a fourth aspect there is a method in a second node. The method comprises: determining an indication of a performance associated with a first node sending traffic through an aggregation of a first link and a second link, and sending a signal to the first node, based on the indication.

According to a fifth aspect there is a computer program comprising instructions which, when executed on at least one processor, cause the at least one processor to carry out the method of any of the embodiments herein.

According to a sixth aspect there is a computer program product comprising a computer-readable medium with the computer program as above.

According to a seventh aspect there is a first node for use in a telecommunications network. The first node comprises a processor and a memory, said memory containing instructions executable by said processor whereby said first node is operative to: acquire an indication of a performance associated with sending traffic through an aggregation of a first link and a second link, and send the traffic through one of: the first link, the second link, and an aggregation of the first link and the second link, based on the indication.

According to an eighth aspect there is a second node. The second node comprises a processor and a memory, said memory containing instructions executable by said processor whereby said second node is operative to: determine an indication of a performance associated with a first node sending traffic through an aggregation of a first link and a second link, and send a signal to the first node, based on the indication.

According to a ninth aspect, there is a communication system including a host computer comprising a communication interface configured to receive user data originating from a transmission from a user equipment (UE) to a base station. The UE comprises a radio interface and processing circuitry, the UE's processing circuitry configured to perform any of the steps of any of the methods in a first node described herein.

In some embodiments the communication system further includes the UE.

In some embodiments the communication system further includes the base station. The base station comprises a radio interface configured to communicate with the UE and a communication interface configured to forward to the host computer the user data carried by a transmission from the UE to the base station.

In some embodiments the processing circuitry of the host computer is configured to execute a host application, and the UE's processing circuitry is configured to execute a client application associated with the host application, thereby providing the user data.

In some embodiments the processing circuitry of the host computer is configured to execute a host application, thereby providing request data, and the UE's processing circuitry is configured to execute a client application associated with the host application, thereby providing the user data in response to the request data.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As noted above, the current invention may be implemented in a telecommunications network. A telecommunications network may be implemented in any appropriate type of system using any suitable components, including, for example, wired and/or wireless components.

Figure 1:
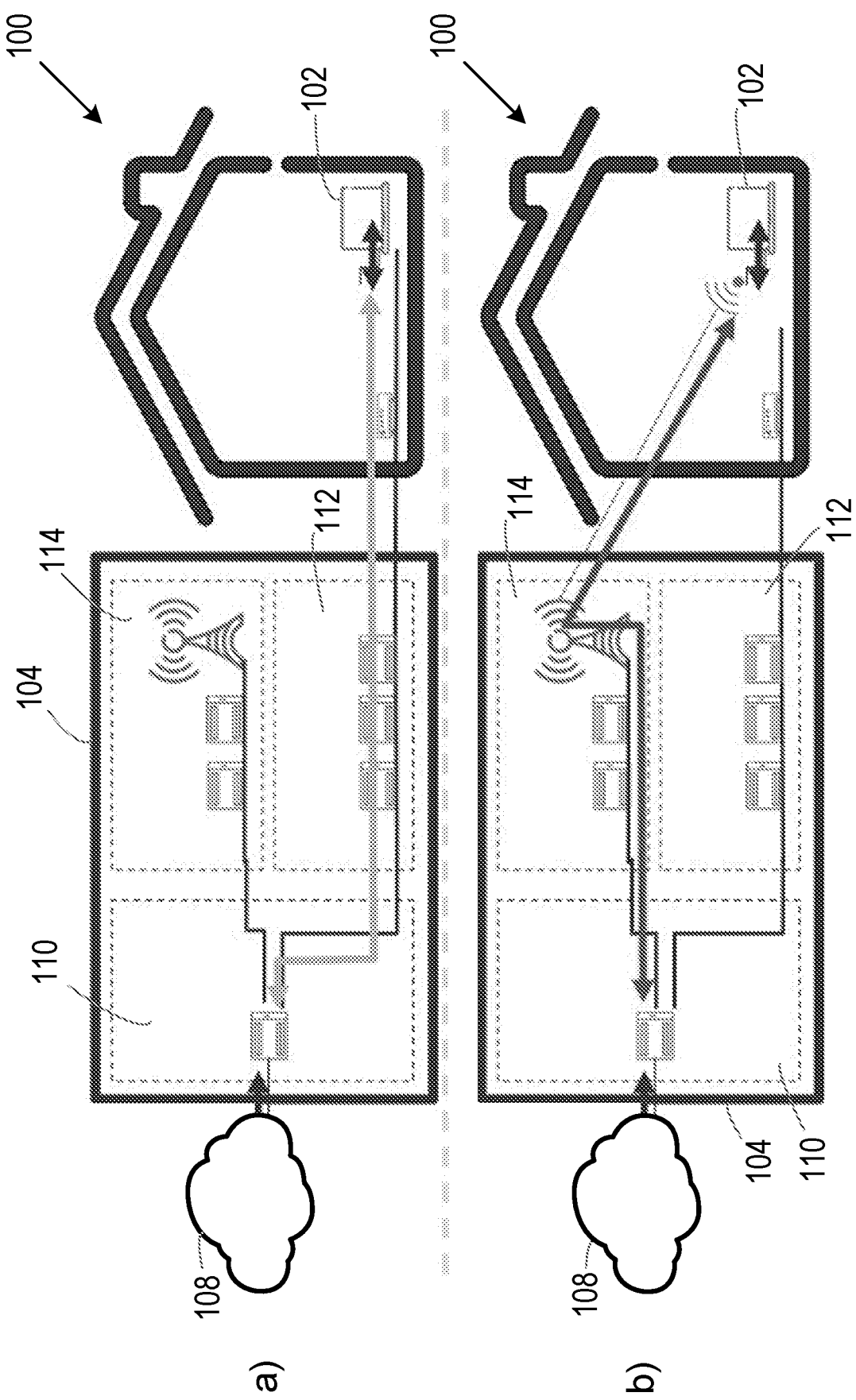
FIGS. 1a and 1b illustrate an example telecommunications network.

FIGS. 1a and 1b illustrate an example telecommunications network 100 suitable for providing traffic to an user equipment 102 of an end user (e.g. a home, or business premises). The telecommunications network 100 comprises an operator's network 104 that allows access to other networks such as the internet 108. The operator's network comprises a core network 110 that provides first and second links to the user equipment 102 of the end user. In this embodiment, the first link 112 comprises a fixed access link (e.g. a wired link) and the second link 114 comprises a Radio Access Network (RAN) link (e.g. a wireless link). Traditionally, as shown in FIG. 1, and noted above, traffic is sent either through the fixed access link 112 (as illustrated in FIG. 1a) or through the RAN link 114 (as illustrated in FIG. 1b).

Figure 2:
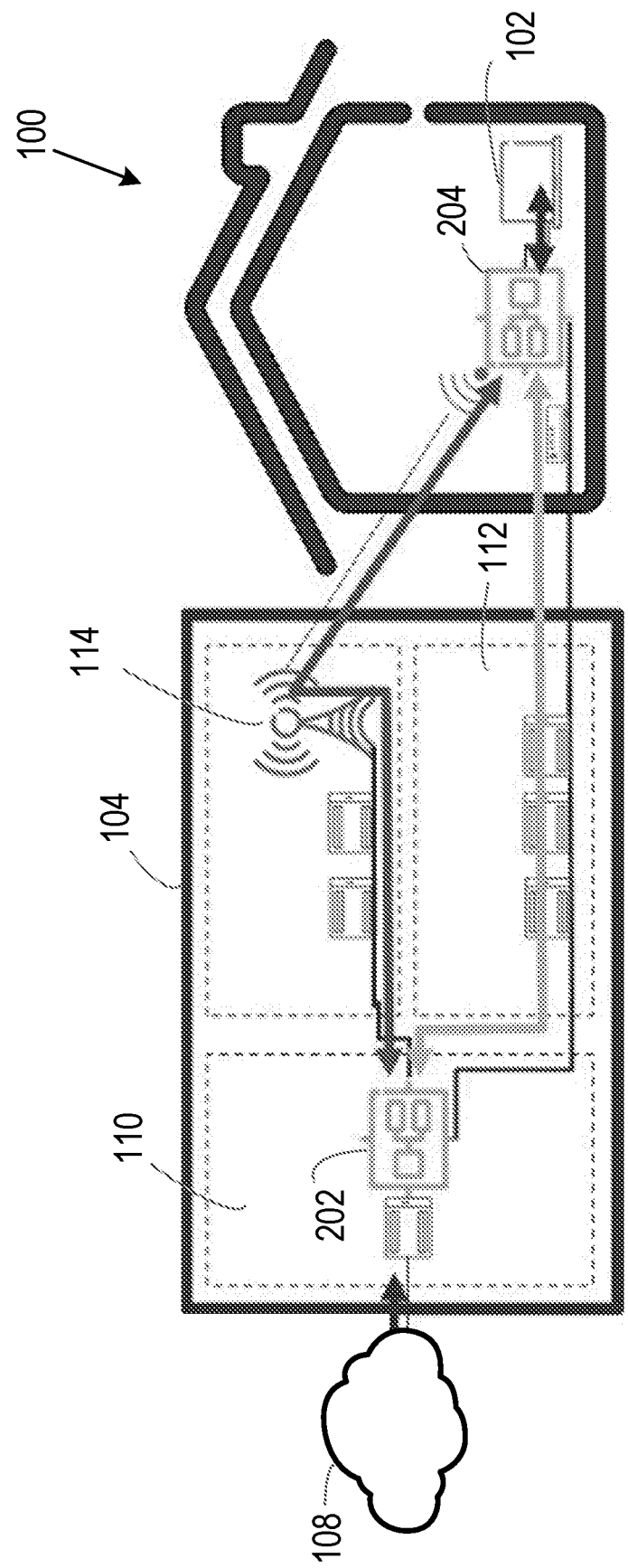
FIG. 2 illustrates a telecommunications network comprising a hybrid access gateway and customer premises gateway to facilitate aggregation of traffic over first and second links.

FIG. 2 illustrates the same telecommunications network as in FIG. 1 with the additional components of a Hybrid-Access gateway (HAG) 202 in the operator's core network 110 and a customer-premise equipment (CPE) 204. The CPE may act as a user equipment with respect to the RAN link. The HAG and CPE co-ordinate with one another to enable usage of an aggregation of both links 112, 114 through the use of multipath techniques. In this way, traffic may be sent across the network using an aggregation of the first link 112 and the second link 114. The skilled person will be familiar with CPEs, HAGs and the use of multipath techniques to facilitate aggregation of traffic across two or more links.

Figure 3:
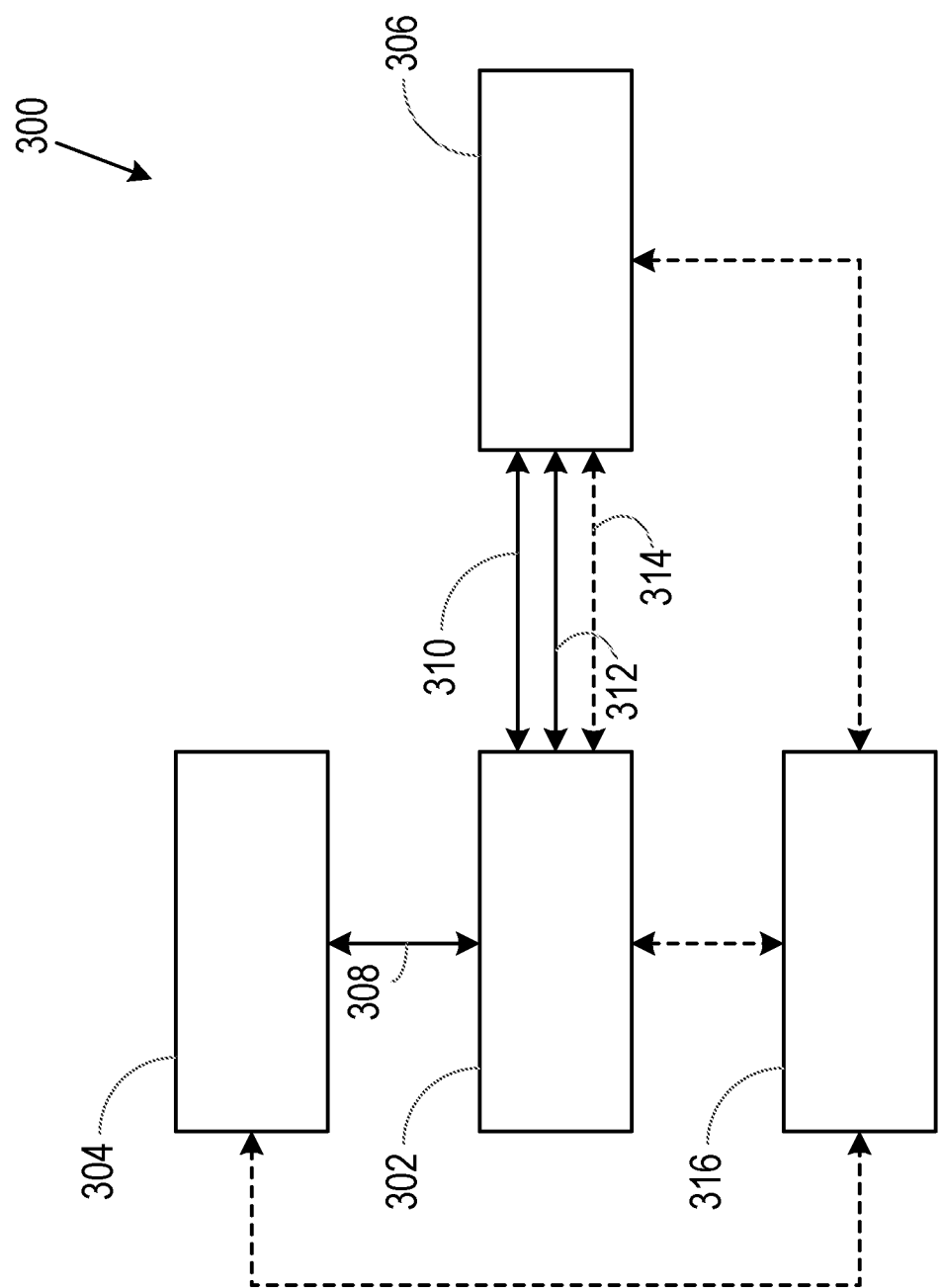
FIG. 3 illustrates an example system according to an embodiment.

FIG. 3 shows a system 300 according to some embodiments. The system comprises a first node 302, a second node 304 and a third node 306. The first node is in communication with the second node 304 through a link 308. The first node is also in communication with the third node 306 through a first link 310 and a second link 312. In some embodiments, the first node may also be in communication with the third node 306 via one or more further links 314. The system 300 may be part of (e.g. connected to) a larger telecommunications network 316 that may comprise any number of wired or wireless networks, network nodes, base stations, controllers, wireless devices, relay stations, and/or any other components or systems that may facilitate or participate in the communication of data and/or signals whether via wired or wireless connections. In embodiments herein, the telecommunications network 316 may be in communication with any one or more of the first node 302, the second node 304 and the third node 306.

Generally, the first node 302 comprises any node in the telecommunications network that is capable of sending (e.g. adapted or configured to send) traffic across the telecommunications network via a first link, a second link and an aggregation of the first link and the second link. In some embodiments, the first node 302, in its capacity to send traffic over the communications network, may generally be thought of as a transmitter or a transmitting node, although it will be appreciated by the skilled person that the first node may also be capable of receiving data.

In some embodiments, the first node 302 comprises a customer-premise equipment (CPE), such as the CPE 204 illustrated in FIG. 2.

In some embodiments, the first node 302 comprises a user equipment. As used herein, user equipment may comprise any device capable of communicating with network nodes and/or other user equipment via one or more wired, wireless or any other forms of communications link. In some embodiments, a user equipment may comprise a wireless device (WD) comprising a device operable to communicate wirelessly with network nodes and/or other wireless devices. Communicating wirelessly may involve transmitting and/or receiving wireless signals using electromagnetic waves, radio waves, infrared waves, and/or other types of signals suitable for conveying information through air. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. Furthermore, a WD as described above may be mobile, such as a mobile device or a mobile terminal.

In some embodiments, the first node 302 comprises a Hybrid-Access gateway (HAG) 202, such as the HAG 202 illustrated in FIG. 2.

As noted above, the first node may be adapted to send traffic through a first link, a second link and an aggregation of the first and second links. The first and second links may comprise any type of wired or wireless link. For example, the first and second links may comprise any one, or any combination of: a wired link (e.g. ADSL based technologies, for example, high speed DSL, xDSL, or other DSL technologies) or a wireless link such as Global System for Mobile Communications (GSM), Wideband Code Division Multiple Access (WCDMA), Long Term Evolution (LTE), WiFi, or Bluetooth wireless technologies. In some embodiments, the first link comprises a different type of communication technology (e.g. a different one of the examples above) to the communication technology of the second link.

As described herein, traffic comprises any form of information that can be sent across a telecommunications network, including, but not limited to, data such as calls, images, video, audio data, text data, short message service messages (SMS messages) and multi-media messaging service messages (MMS messages).

Figure 4:
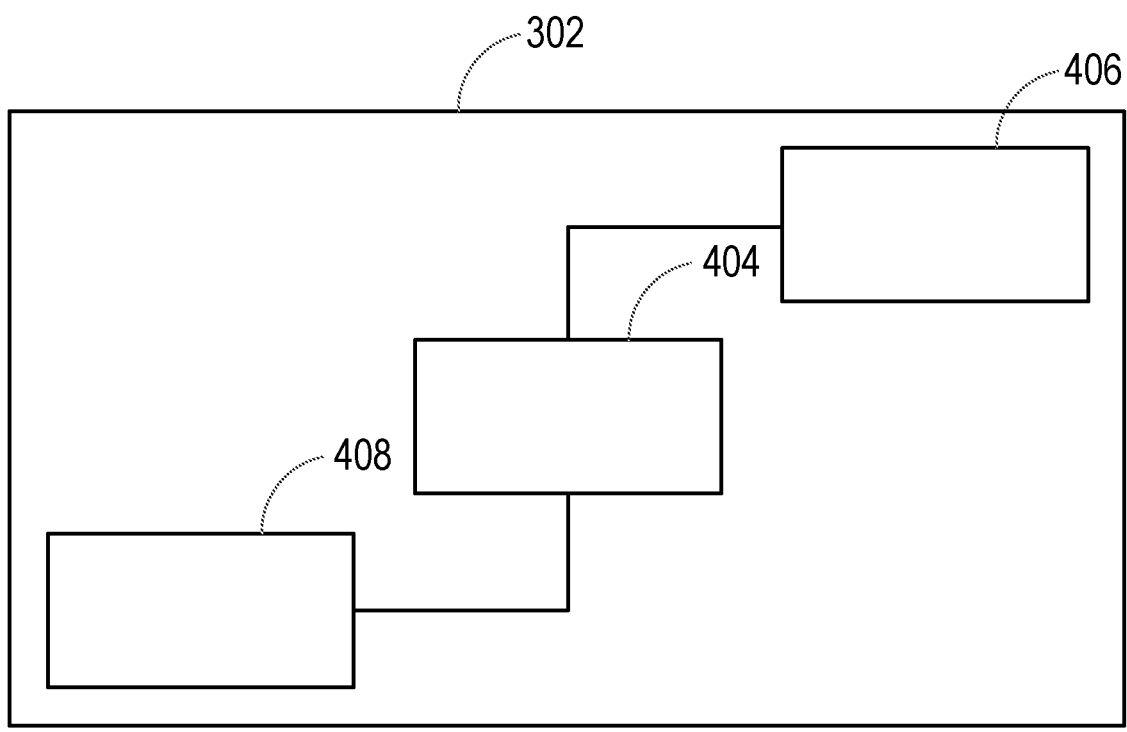
FIG. 4 illustrates an example first node for use in a telecommunications network according to an embodiment.

In some embodiments, as shown in FIG. 4, the first node 302 comprises a processor 404 and a memory 406. In some embodiments, the memory 406 contains instructions executable by the processor 404. The first node 302 may be operative to perform the methods described herein. For example, in some embodiments, the instructions when executed by the processor 404 may cause the processor 404 to perform the methods described herein.

The memory 406 may be configured to store the instructions in the form of program code that can be executed by the processor 404 to perform the method described herein. In some implementations, the instructions can comprise a plurality of software and/or hardware modules that are each configured to perform, or are for performing, individual or multiple steps of the method described herein. In some embodiments, the memory 406 may be part of a device that also comprises one or more other components of the first node 302 (for example, the processor 404 and/or one or more other components of the first node 302). In alternative embodiments, the memory 406 may be part of a separate device to the other components of the first node 302.

The processor 404 of the first node 302 can be configured to communicate with the memory 406 to execute the instructions. The processor 404 can comprise one or more processors, processing units, multi-core processors or modules that are configured or programmed to control the first node 302 in the manner described herein. In some implementations, for example, the processor 404 may comprise a plurality of processors, processing units, multi-core processors and/or modules configured for distributed processing. It will be appreciated by a person skilled in the art that such processors, processing units, multi-core processors and/or modules may be located in different locations and may each perform different steps and/or different parts of a single step of the method described herein.

Briefly, as will be described in more detail below, the first node 302 is operative to (e.g. adapted to) acquire an indication of a performance associated with sending traffic through an aggregation of a first link and a second link. The first node 302 is further operative to send the traffic through one of: the first link 310, the second link 312, and an aggregation of the first link 310 and the second link 312, based on the indication.

As described above, it has been recognised by the inventors herein that where two (or more) links are available, under asymmetric conditions (e.g. where the performance of one link is less than that of the other link(s)) the "bad" link may degrade the performance of an aggregation of the first and second links. In some cases, the bad link may degrade the performance to less than that of the single "good" link alone. Under these conditions, it is therefore prudent to utilize the single best link, despite the availability of the second link. Thus, by adapting the first node 302 to acquire an indication of a performance associated with sending the traffic through an aggregation of the first 310 and second 312 links before the traffic is sent, the first node 302 is able to dynamically determine whether traffic would be more efficiently sent across the first link 310, the second link 312 or an aggregation of the first and second links. In this way, the first node 302 is able to send the traffic through the link (or aggregation of links) with the highest performance, leading to better performance outcomes for the end-user.

In some embodiments, the processor 404 may be operative (e.g. adapted) to control the memory 406 to store data or information relating to the methods described herein. For example, the memory 406 may be used to store the indication of a performance associated with sending traffic through an aggregation of a first link and a second link.

In some embodiments, the first node 302 may further comprise an interface 408 capable of (e.g. adapted to, operative to, or configured to) send traffic through the first link 310, the second link 312 and an aggregation of the first link 310 and the second link 312. The interface 408 may be used in wired and/or wireless communication of signalling and/or data between first node 302, the second node 304, the third node 306 and the wider telecommunications network 316. As such, interface 408 may comprise port(s) and/or terminal(s) to send and/or receive data, for example to and from the second node 304, the third node 306 and/or the telecommunications network 316 over a wired connection. Interface 408 may further comprise radio front end circuitry that may be coupled to, or in certain embodiments a part of, an antenna to facilitate wireless communication, for example, to and from the second node 304, the third node 306 and/or the telecommunications network 316. The skilled person will appreciate that the interface 408 may comprise different components and/or different combinations of components to those described herein, depending on the type of interface and/or whether the interface 408 is configured for wired or wireless communications (or both). For example, if interface 408 is configured for wireless communication, interface 408 may comprise filters and/or amplifiers to convert digital data into a radio signal having appropriate channel and bandwidth parameters.

Turning now to the second node 304, the second node may comprise any node (whether part of telecommunications network 316 or otherwise) that is capable of (e.g. configured or adapted to) determining an indication of a performance associated with a first node sending traffic through an aggregation of a first link and a second link. In some embodiments, the second node may be described as a multi-path benefit estimator in the sense that the second node may estimate (or predict) the benefit associated with sending traffic through an aggregation of the first and second links.

In some embodiments, the second node may be implemented in software, for example as a software module. Such a software module may be comprised in any node of a telecommunications network. In some embodiments, the second node comprises a software module in a HAG, such as the HAG 204 in FIG. 2.

In some embodiments, the second node may be comprised in another module of the operator's network, such as the operator's network 104 shown in FIG. 2. In some embodiments, the second node may be stored in one or more remote servers, accessible via the internet 108. In some embodiments, the second node may be implemented in a distributed fashion, for example, via cloud-computing. The skilled person will be familiar with cloud computing. Such embodiments have the advantage that they may be available to a much larger proportion of the operator's network and/or may be applied across different operator's networks. In some embodiments, the functionality of the second node may be available as-a-service, thereby enabling a cloud based service accessible by any telecom operators or manager of hybrid-link solutions (e.g. facility management companies, real-estate or hotels) who wish to improve the performance of their networks. A cloud-based second node therefore enables the functionality of the single second-node to be used by a much wider variety of first node devices.

Figure 5:
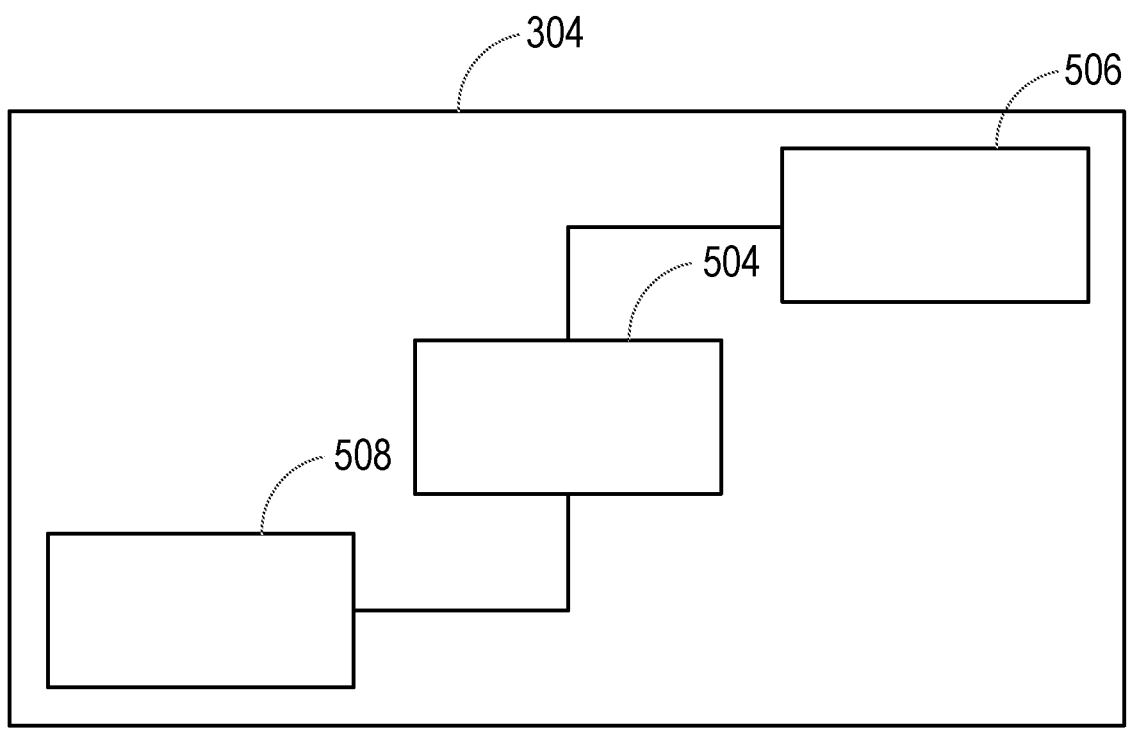
FIG. 5 illustrates an example second node according to an embodiment.

In some embodiments, the second node 304 may be as shown in FIG. 5. In this embodiment, the second node 304 comprises a processor 504, a memory 506 and an interface 508. General details of processors, memories and interfaces were described above with respect to the processor 404, memory 406 and interface 408 of FIG. 4 and the details described therein will not be repeated but will be understood to apply equally to the processor 504, memory 506 and interface 508.

Briefly, as will be described in more detail below, the second node 304 is operative to (e.g. adapted to) determine an indication of a performance associated with a first node sending traffic through an aggregation of a first link and a second link, and send a signal to the first node, based on the indication.

As was noted above, by determining an indication of a performance associated with a first node sending traffic through an aggregation of a first link and a second link, the second node is able to provide information to the first node that enables the first node to determine whether to send traffic through the first link, the second link or an aggregation of the first link and the second link. As such, the second node enables the first node to send traffic through the link (or aggregation of links) that provides the best performance, thereby improving performance for the user.

Figure 6:
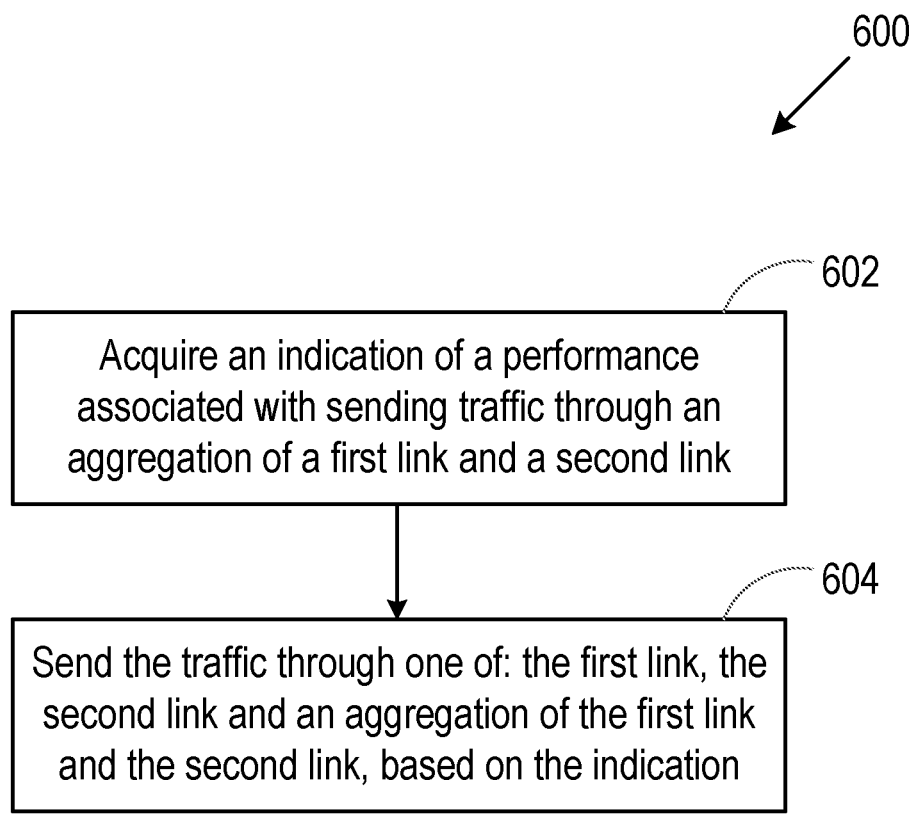
FIG. 6 illustrates an example method in a first node according to an embodiment.

Turning now to FIG. 6, according to some embodiments, there is a method 600 in a first node, the first node being for use in a telecommunications network. The method 600 may be performed by a first node such as the first node 302 described above with respect to FIGS. 3 and 4.

In a first step 602, the method 600 comprises acquiring an indication of a performance associated with sending traffic through an aggregation of a first link and a second link. The method then comprises in a second step 604, sending the traffic through one of: the first link, the second link, and an aggregation of the first link and the second link, based on the indication.

In some embodiments, the indication of a performance associated with sending traffic through an aggregation of a first link and a second link comprises a numerical value indicating the performance of the aggregation of the first link and the second link. For example the indication may be an indication of an (e.g. estimated, or predicted) throughput, bit-rate, or performance gain associated with using an aggregation of the first link and the second link.

In some embodiments, the indication indicates the performance associated with sending traffic through an aggregation of the first link and the second link relative to the performance associated with routing the traffic through one or both of the first link and the second link individually. As such, the indication may provide an estimation (or prediction) of the benefit associated with sending traffic through an aggregation of the first and second links compared to sending traffic through one or either of the links individually. In some embodiments, the indication may comprise a percentage value, indicating the relative throughput compared to one or other of the first and second links. For example, in an embodiment whereby the first link 310 and the second link 312 are operating optimally, e.g. the first link and the second link both have throughputs of 100%, the indication may comprise a value of "200%", indicating that if an aggregation of the first link and the second link is used, the throughput is the sum of both links working at full capacity.

The skilled person will appreciate that an indication based on the performance of the aggregation of the first link and the second link relative to the performance of one or both of the first and second links individually may take various forms, in addition or equivalent to those detailed herein. For example, the indication may be in the form of a tuple, the first value in the tuple comprising the relative performance compared to the first link, the second value of the tuple being the relative performance compared to the second link. Alternatively, the indication may comprise the relative performance compared to the best (or worst) performing link of the first link and the second link. In this way, the indication is able to provide information to the first node to enable the first node to determine whether the performance will be increased if the traffic is sent through an aggregation of the first link and the second link compared to the first link or the second link individually.

In some embodiments, the indication may be based on one or more relationships between network parameters for the first link, network parameters for the second link and the performance associated with sending traffic through an aggregation of the first link and the second link. For example, the indication may be based on knowledge of what performance can be expected for an aggregation of first and second links (e.g. a combined multipath solution), based on the characteristics of the individual links. In some embodiments, the indication may be based on a relationship that describes relative combined (e.g. aggregated) throughput for different link conditions (e.g. different measured values of network conditions on the first link and/or network conditions on the second link).

In some embodiments, the one or more relationships may be based on empirical data. For example, the empirical data may comprise the results of experiments carried out that map network parameter(s) of the first link and/or network parameter(s) of the second link to a performance associated with an aggregation of the first link and the second link. In some embodiments, the indication may be generated using a network emulator that emulates network conditions and can be used to determine (e.g. predict) performances of links or aggregations of links under the emulated conditions. In this way, the performance of an aggregation of the first link and the second link can be determined by introducing varying e.g. delays, bandwidth and packet-losses on each of the first and second (emulated) links.

Figure 7:
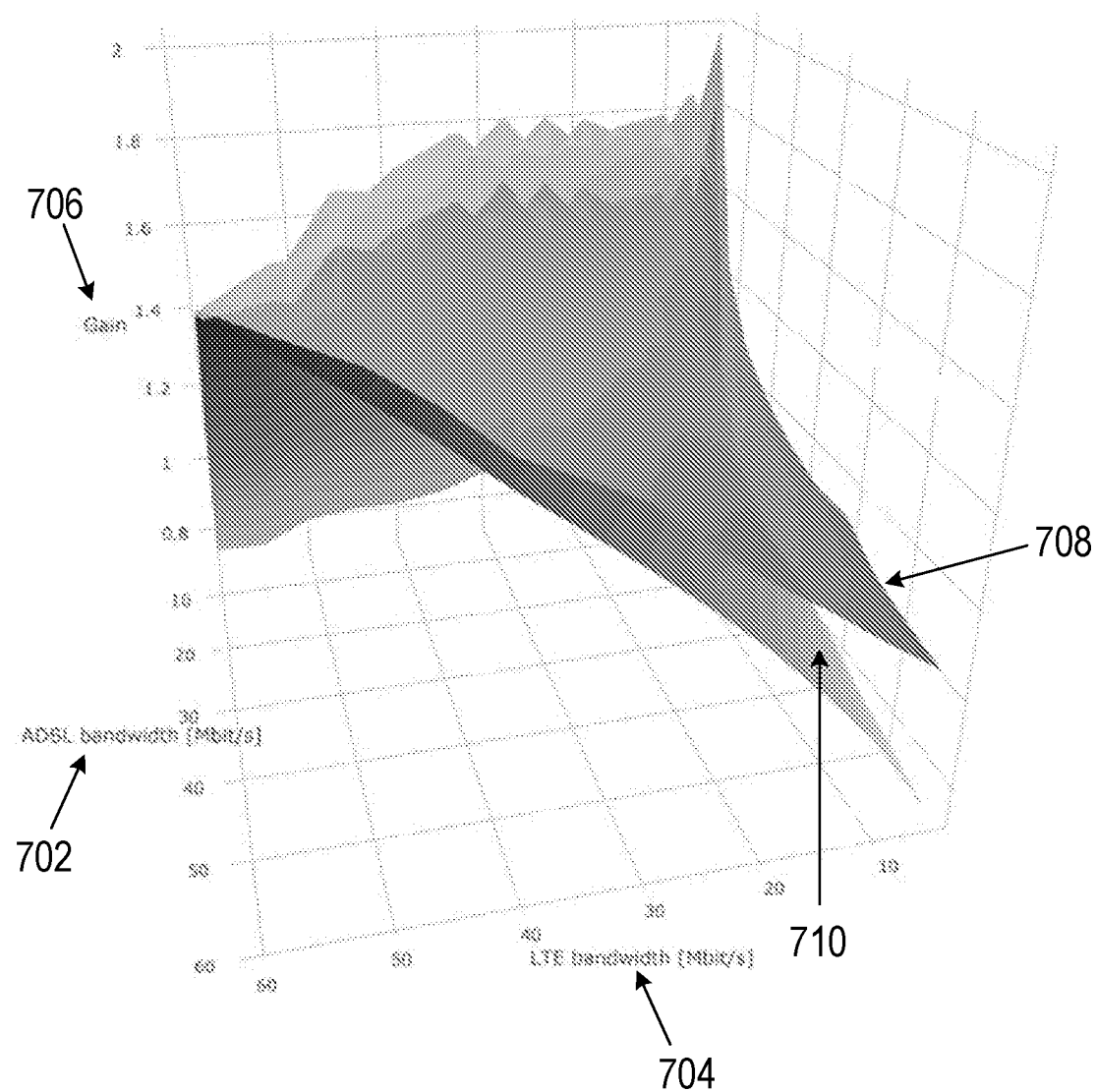
FIG. 7 illustrates an example relationship between bandwidth on a first link, bandwidth on a second link and a performance associated with sending traffic through an aggregation of the first link and the second link, for two different multi-path protocols.

FIG. 7 illustrates an example relationship between network parameters for the first link, network parameters for the second link and the performance associated with sending traffic through an aggregation of the first and second link, according to an embodiment. In this embodiment, the first link comprises an asymmetric digital subscriber line (ADSL) link (e.g. a wired link) and the second link comprises a Long-Term Evolution (LTE) wireless link. The bandwidth of the ADSL link (e.g. first link) is shown on the y-axis 702 of FIG. 7 and the bandwidth of the LTE link is shown on the x-axis 704 of FIG. 7. The z-axis 706 of FIG. 7 shows the gain associated with aggregations of the ADSL and LTE links (e.g. the relative performance associated with an aggregation of the first and second links). The upper dataset 708 illustrates the gain associated with aggregating the first and second links using the Multipath TCP (MPTCP) protocol and the lower dataset 710 illustrates the gain associated with aggregating the first and second links using the Multi-Path Transport (MPT) protocol.

It will be appreciated by the skilled person that the relationship illustrated in FIG. 7 is merely an example, and that many other relationships between network parameters of the first link, network parameters of the second link and a performance of an aggregation between the first link and the second link may be defined or measured. Furthermore, it will be appreciated that such a relationship may be multi-dimensional, for example, a plane may be defined in four- or more dimensions, describing the relationship between measured values of two or more parameters for the first node, two or more parameters for the second node and a performance associated with the first node sending traffic through an aggregation of a first link and a second link. Alternatively, other curves or planes derived for other network parameters (e.g. link "imperfections", e.g., delay, packet-loss rates, etc) may be combined to obtain a more accurate indication of a performance associated with an aggregation of the first link and the second link, based on multiple network parameters.

It will further be appreciated that in some embodiments, the indication may comprise an indication of a performance associated with sending traffic through an aggregation of a first link, a second link and one or more further links. In this way, the indication may be used to determine whether traffic should be sent through the first link, the second link, one or more further links, or an aggregation of the first, second and/or one or more further links. In such embodiments, the relationship may comprise a relationship between network parameters for the first link, network parameters for the second link, network parameters for the one or more further links and the performance associated with sending traffic through an aggregation of the first link, the second link and the one or more further links. It will also be appreciated that more than one indication may be determined, for example a first indication may be determined of a performance associated with the first node sending traffic through an aggregation of a first link and a second link. Additionally or alternatively, a second indication may be determined of a performance associated with the first node sending traffic through an aggregation of a second link and a third link. Additionally or alternatively, a third indication may be determined of a performance associated with the first node sending traffic through an aggregation of a first link, a second link and a third link. Thus, the first node 302 may acquire one or more indications that enable the first node to determine which and how many links to aggregate when sending traffic, according to the current link conditions.

In general, one or more network parameters for the first link and/or the one or more network parameters for the second link may comprise one or more network conditions and/or one or more service requirements. Examples of network conditions include a signal strength on a link, a re-transmission rate on a link, a delay between sending a signal across a link and receiving an acknowledgement of said signal, a jitter on a link and a network load on a link. Such network conditions may be correlated with performance of an aggregation between a first link and a second link. Examples of service requirements include a quality of service requirement on a link, user subscription information and the data type of the traffic. For example, in some embodiments, service requirements or user subscription information may prevent a link from being utilised to its full capacity (e.g. if the user does not have an appropriate subscription) and thus this may affect the performance of an aggregation between a first link and a second link. Furthermore, the type of traffic (e.g. whether the data comprises voice, SMS, video etc.) may affect the performance of an aggregation between the first link and the second link.

In some embodiments, the step of acquiring 602 an indication of a performance associated with sending traffic through an aggregation of a first link and a second link, comprises the first node 302 receiving a signal comprising the indication from a second node 304.

For example, in some embodiments, the first node 302 may passively receive the indication from the second node 304 (e.g. the second node may send the indication to the first node without the first node requesting or otherwise instigating the second node to send the indication.)

In some embodiments, the first node 302 may perform an action to trigger a second node 304 to send the indication to the first node. For example, in some embodiments, the step of acquiring 602 may comprise the first node sending measurements of one or more network parameters for the first link and/or measurements of one or more network parameters for the second link to the second node and receiving the indication from the second node in response to the sending of the measurements. For example, the sending of the measurements of one or more network parameters for the first link and/or measurements of one or more network parameters for the second link to the second node may trigger (or cause) the second node to acquire (e.g. calculate, derive or look-up as will be described in more detail below) the indication and send the indication to the first node.

In some embodiments, the first node may periodically send measurements (e.g. periodically query) the second node with measurements of one or more network parameters for the first link and/or measurements of one or more network parameters for the second link (e.g. the current link conditions). In this way the first node may dynamically schedule traffic over the first and second links, or an aggregation of the first and second links. In some embodiments, the first node may send measurements (e.g. query) the second node when the first node detects or measures a change in a network parameter (e.g. a change in link conditions).

In some embodiments, the first node may acquire the indication locally. For example, the step of acquiring 602 may comprise acquiring measurements of one or more network parameters for the first link and measurements of one or more network parameters for the second link. The step of acquiring may further comprise determining the performance associated with sending traffic through an aggregation of the first link and the second link based on: i) the measurements of the one or more network parameters for the first link ii) the measurements of the one or more network parameters for the second link and/or iii) one or more relationships between network parameters for the first link, network parameters for the second link and the performance associated with sending traffic through an aggregation of the first link and the second link.

The step of determining the performance associated with sending traffic through an aggregation of the first link and the second link may comprise, for example, querying a static database of measured parameters and performances to determine the performance based on the measurements. Such a database may be a local database (e.g. stored on the first node) or a remote database (e.g. stored on a second node). Such a database may be populated based on experimental (e.g. empirical) data. For example, measurements (either real or simulated) could be carried out beforehand, to obtain a profile of how aggregated (e.g. multipath or combined) performance would change, based on varying individual link qualities, as described above.

Alternatively, the step of determining may comprise using a relationship between network parameters for the first link, network parameters for the second link and the performance associated with sending traffic through an aggregation of the first link and the second link. Such a relationship may be stored locally, (e.g. on the first node) or remotely (e.g. on another node). Examples of such relationships were described in detail above, with respect to FIG. 6 and the details therein will be understood to also apply here.

The first node 302 may acquire measurements of one or more network parameters for the first link and measurements of one or more network parameters for the second link by measuring the parameters directly (e.g. through the use of test or calibration signals). Alternatively or additionally, the first node may acquire the measurements through the telecommunications network. For example, the first node may request the parameters from the telecommunications network 316. Alternatively or additionally, the telecommunications network 316 may send the measurements to the first node 302 unsolicited, for example, periodically or in response to a change in measured network parameters. In further embodiments, the step of acquiring measurements may comprise acquiring the measurements from a third node. The third node may be, for example, the node to which the first node sends the traffic in step 604 of method 600.

Turning now to step 604, in some embodiments, the first node 302 is adapted to send the traffic through the first link 310 if the indication indicates that the performance associated with sending traffic through an aggregation of the first link and the second link is less than the performance of the first link. In this way, the first node 302 is adapted to send the traffic through an individual one of the links, preferentially over an aggregation of the first link and the second link, if the indication indicates that the performance of an individual link is greater (e.g. provides better performance) than an aggregation of the first link 302 and the second link 304. This may be beneficial, for example, when one or other of the first and second links exhibit delays, jitter and/or packet losses which result in inferior performance of the aggregation of the first and second links compared to use of the first link alone. In some examples, if the performance of one of the links is less than optimal (e.g. less than 100%) then the indication may comprise an indication that the performance associated with an aggregation of the first link and the second link is, for example, "75%" (or any other percentage relative to the optimal throughput of a single link). In this case, it would be better to send traffic through the single good link, which would then result in "100%" throughput for that link.

In some embodiments, the first node is adapted to send the traffic through an aggregation of the first link and the second link if the indication indicates that the performance of the first link and the performance of the second link are each individually less than the performance associated with sending traffic through an aggregation of the first link and the second link. As such, if the performance of the first link is less than (e.g. the first link provides inferior performance to) the performance of the aggregation of the first and second links and the performance of the second link is less than the performance of the aggregation of the first and second links, then the first node is adapted to send the traffic through an aggregation of the first link and the second link. For example, the indication of the performance of an aggregation of the first link and the second link may indicate "125%" (or any other percentage over 100%). In this case, it would be still be better to send the traffic through an aggregation of the first and second links as the indicated performance is above the full performance of a single link (indicated as "100%").

The first node may aggregate the traffic through the first link and the second link using any suitable protocol, including but not limited to the Multipath TCP (MPTCP) and the Multi-protocol Transport (MPT) protocols. In this way, the end user benefits from the increased performance associated with the aggregation of the first and second links.

It will be appreciated that any of the embodiments above may be generalised to more than two links. For example, in some embodiments, the step of acquiring an indication 602 may comprise acquiring an indication of a performance associated with sending traffic through an aggregation of the first link, the second link and one or more further links. In such embodiments, the step of sending the traffic 604 may then comprise sending the traffic through one of: the first link, the second link, one of the one or more further links, and an aggregation of any of the first link, the second link and the one or more further links, based on the indication.

By having knowledge of what sort of performance can be expected for an aggregation, based on the measured parameters of the individual paths or links in this way, the first node can decide how to transmit information it needs to send, i.e., by utilizing a subset of the available links, or all the links combined, so as to obtain the best performance (e.g., throughput). In this way, the first node may dynamically change its scheduling in real time, based on varying link conditions. In this way the receiving node always gets the best performance possible under the current network conditions. There is thus provided a system and method for more efficiently scheduling traffic over a first link, second link and/or aggregation of said first link and said second link.

It is noted that while it might be possible to reconfigure the multipath protocol(s) used to aggregate the first and second links, to make the aggregation perform better under a specific "poor performance" condition (e.g., by increasing buffers or expanding window sizes, etc.), this type of solution is impractical particularly for large-scale deployments. The solution described above avoids these problems by enabling the first node to avoid using a poor quality link, for example, until it improves at a later time.

Figure 8:
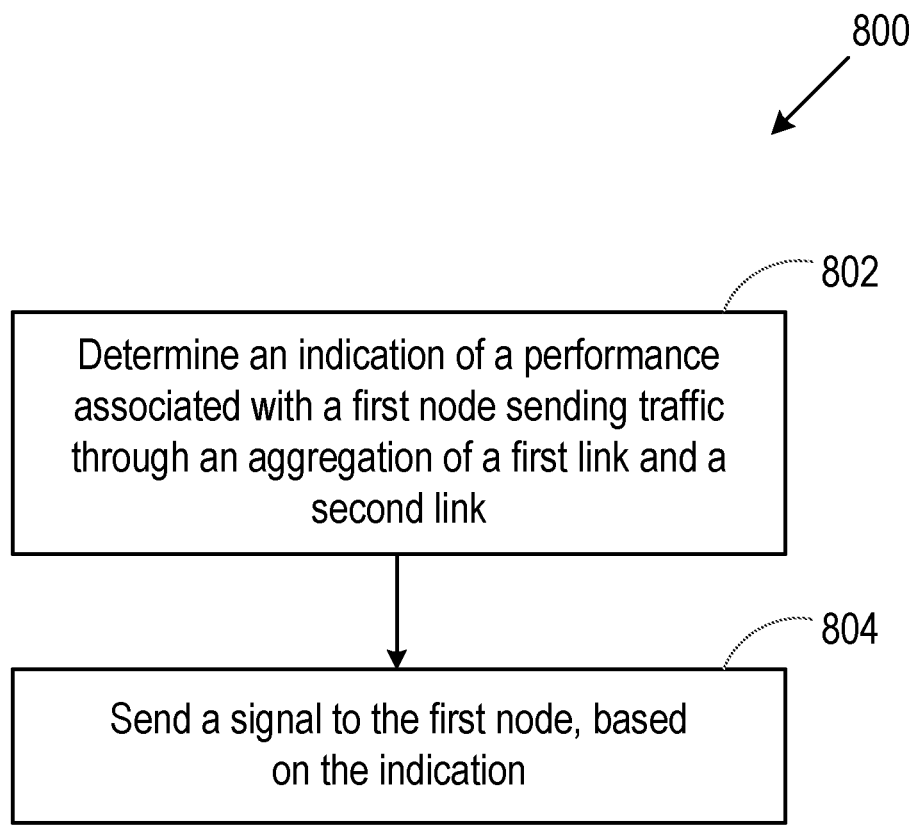
FIG. 8 illustrates an example method in a second node according to an embodiment.

Turning now to FIG. 8, according to some embodiments, there is a method 800 in a second node. The method 800 may be performed by a second node such as the second node 304 described above with respect to FIGS. 3 and 5.

In a first step 802, the method 800 comprises determining an indication of a performance associated with a first node sending traffic through an aggregation of a first link and a second link. In a second step 804, the method 800 comprises sending a signal to the first node, based on the indication.

In some embodiments, the indication indicates the performance associated with sending traffic through an aggregation of the first link and the second link relative to the performance associated with routing the traffic through one or both of the first link and the second link individually. In some embodiments, the indication is based on one or more relationships between network parameters for the first link, network parameters for the second link and the performance associated with sending traffic through an aggregation of the first link and the second link. The indication was described above in detail (e.g. the form and provenance of the indication) with respect to the method 600 as shown in FIG. 6 and the details therein will be understood to apply equally to the method 800.

In some embodiments, the step of determining 802 an indication comprises the second node determining the indication based on a database that maps values of different parameters (e.g. simulated and/or measured parameters) associated with the first link and the second link to performances associated with aggregations of the first link and the second link. The entries in such a database may be specific to a specific protocol, for example, MPTCP or MPT. In some examples, more than one database may be used for each protocol.

In some embodiments, the step of determining 802 an indication comprises the second node 304 determining the indication based on a relationship between network parameters for the first link, network parameters for the second link and the performance associated with sending traffic through an aggregation of the first link and the second link. Examples of such relationships were described in detail above with respect to Method 600 and FIGS. 6 and 7 and the details therein will be understood to apply equally to step 802. However, in brief, such a relationship may be used to map measurements of one or more network parameters for the first link and/or measurements of one or more network parameters for the second link to the indication of a performance associated with a first node 302 sending traffic through an aggregation of a first link and a second link.

Examples of network conditions include a signal strength on a link, a re-transmission rate on a link, a delay between sending a signal across a link and receiving an acknowledgement of said signal, a jitter on a link and a network load on a link (e.g. which are all examples of link conditions). Such network conditions may be correlated with performance of an aggregation between a first link and a second link. Examples of service requirements include a quality of service requirement on a link, user subscription information and the data type of the traffic. For example, in some embodiments, service requirements or user subscription information may prevent a link from being utilised to its full capacity (e.g. if the user does not have an appropriate subscription) and thus this may affect the performance of an aggregation between a first link and a second link. Furthermore, the type of traffic (e.g. whether the data comprises voice, SMS, video etc.) may affect the performance of an aggregation between the first link and the second link. As described above with respect to FIG. 7, the relationship may be derived empirically from experimental data and may be in the form of a multi-dimensional plane corresponding to the values of the performance of an aggregation between the first link and the second link, for different measured values of network parameters for the first link and/or network parameters for the second link.

In some embodiments, the step of determining 802 an indication comprises the second node receiving measurements of one or more network parameters for the first link and/or measurements of one or more network parameters for the second link. The step of determining 802 may further comprise the second node determining the performance associated with sending traffic through an aggregation of the first link and the second link, based on: the received measurements; and/or one or more relationships between network parameters for the first link, network parameters for the second link and the performance associated with sending traffic through an aggregation of the first link and the second link.

In some embodiments, the step of receiving measurements may comprise the second node receiving measurements from the first node. For example, the first node may send measurements to the second node to trigger the second node to determine the indication. As such, the second node may be adapted to determine the indication in response to receiving the measurements of the one or more network parameters for the first link and/or the measurements of the one or more network parameters for the second link from the first node.

In some embodiments, the step of receiving measurements may comprise the second node receiving measurements from another node. For example, another node may send measurements to the second node to trigger the second node to determine the indication. In such embodiments, the other node may, for example, comprise a node in the telecommunications network such as the node 316 in FIG. 3. In some embodiments, the other node may send measurements to the second node at regular intervals or in response to changes in network conditions (for example in response to congestion being detected on a particular link). In this way, the second node may be continuously updated (e.g. in real time). For example, while the first node may have no knowledge of it, the network (e.g. network node 316) could inform the second node 304 that a first link such as a cellular link should not be considered for aggregation, since said cell is currently congested. The second node may therefore take this into consideration when determining the indication.

In some embodiments, the other node may comprise a node to which the first node sends traffic, such as the third node 306 in FIG. 3. In this way, a network 316 and/or a receiving node 306 may trigger the second node to determine the indication. As such, the second node may be adapted to determine the indication in response to receiving the measurements of the one or more network parameters for the first link and/or the measurements of the one or more network parameters for the second link from the third node. This may allow other nodes in the network to dynamically trigger assessment of whether the first node is scheduling traffic in a way that will deliver the best performance. In this way, another node in the network may signal to the first node, based on an indication determined by the second node, to change its scheduling in real time, in response to varying link conditions.

Turning to step 804, in some embodiments, the step of sending a signal to the first node based on the indication may comprise sending the indication to the first node (e.g. the signal may comprise the indication). In this way, the first node may determine whether to send traffic over the first link, the second link or an aggregation of the first link and the second link, based on the indication.

In some embodiments, the step of sending 804 a signal to the first node may comprise sending an instruction to the first node, based on the indication. For example, the step 804 may comprise the second node determining whether the first node should send the traffic through the first link, the second link or an aggregation of the first and second links. In some embodiments, the step of sending may comprise sending a signal to the first node to instruct the first node to send the traffic through one of: the first link, the second link, and an aggregation of the first link and the second link, based on the indication.

In some embodiments, the step of sending 804 a signal to the first node comprises sending a signal instructing the first node to send the traffic through the first link if the indication indicates that the performance associated with sending traffic through an aggregation of the first link and the second link is less than the performance of the first link. For example, if the second node determines, based on the indication that the performance on the first link (or the second link) is better compared to the performance associated with an aggregation of the first and second links, then the second node may directly instruct the first node to send traffic over the higher performing first link.

In some embodiments, the step of sending 804 a signal to the first node comprises sending a signal instructing the first node to send the traffic through an aggregation of the first link and the second link if the indication indicates that the performance of the first link and the performance of the second link are each individually less than the performance associated with sending traffic through the aggregation of the first link and the second link. In this way, if the second node determines, based on the indication, that the performance of an aggregation of the first link and the second link would be superior to the performance of either the first link or second link individually, then the second node may directly instruct the first node to send traffic over an aggregation of the first node and the second node. In this way, the second node can improve scheduling of traffic from the first node.

It will be appreciated that the signal may comprise further components additionally or alternatively to those described herein, for example, the signal may comprise the indication in addition to an instruction to send traffic over a particular link (or aggregation of links).

It will further be appreciated that any of the teachings herein may be extended to three or more links. For example determining 804 an indication may comprise the second node determining an indication of a performance associated with sending traffic through an aggregation of a first link, a second link and one or more further links. The second node may then determine whether the first node should send traffic over the first, second, one or more further links, or an aggregation of the first link, second link and one or more further links (or a subset of the one or more further links). In this way, the second node is able to dynamically influence the scheduling of the first node over a plurality of links.

Figure 9:
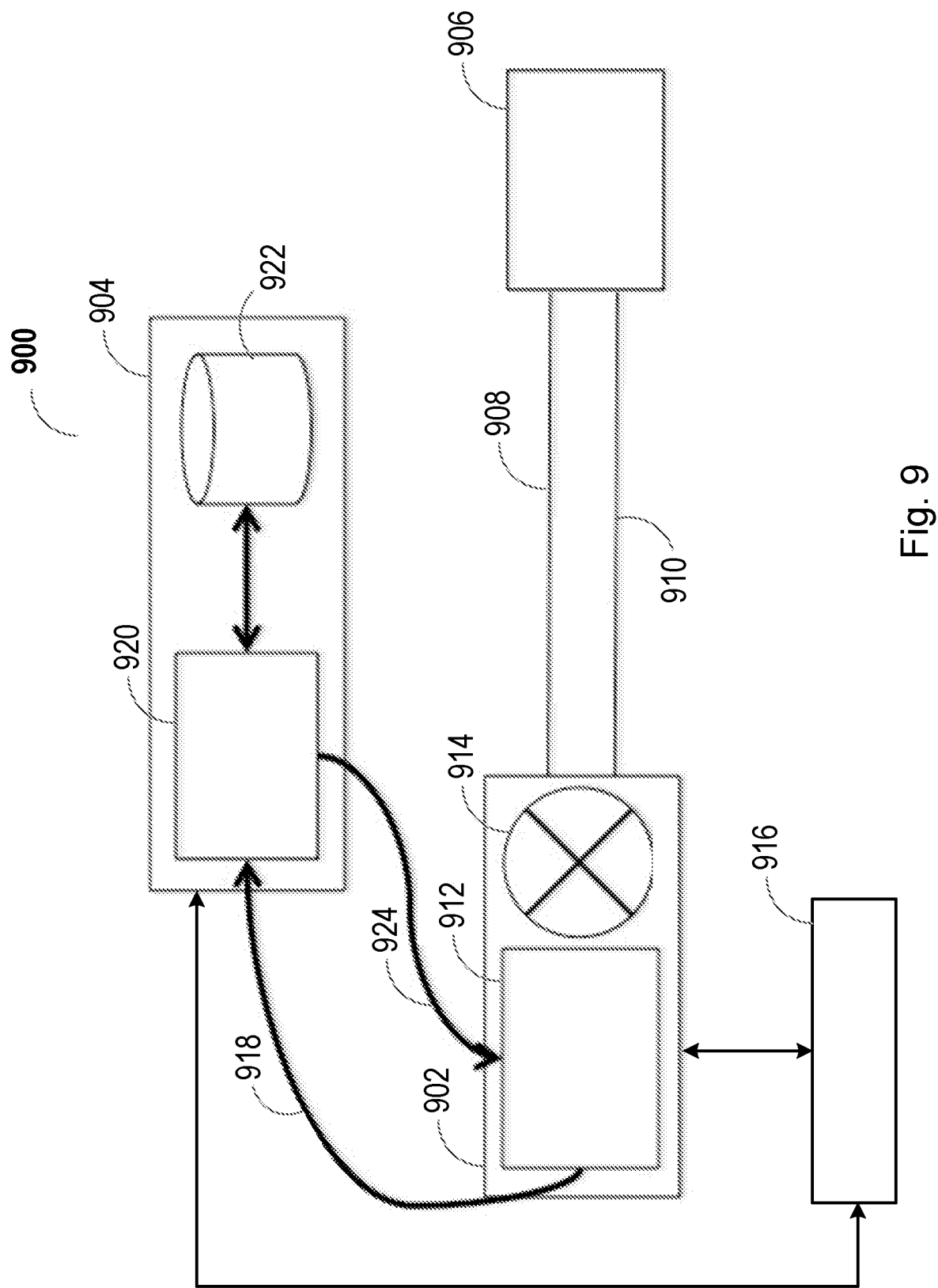
FIG. 9 shows an example system according to an embodiment.

Turning now to FIG. 9, FIG. 9 shows an example system 900 according to an embodiment. The System 900 comprises a first node 902, a second node 904 and a third node 906. In this embodiment, the first node 902 comprises a transmitter node that transmits traffic (e.g. voice, data, SMS, MMS, signalling data, etc) to a third node 906. In this sense, the third node 906 is a receiver node. The first node 902 is operative (e.g. adapted or configured) to send traffic to the third node 906 through a first link 908, a second link 910 and/or an aggregation of the first link and the second link. The first link 908 and the second link 910 may comprise any of the link technologies described above with respect to FIGS. 1-8. The first link 908 may comprise the same or a different type of communication technology to the communication technology of the second link 910.

The first node 902 comprises a controller 912. The controller may comprise a processor such as processor 404 and memory such as memory 406 as was described with respect to first node 302 and FIG. 4 above. The first node 902 may be operative to acquire measurements of one or more network parameters for the first link 908 and measurements of one or more network parameters for the second link 910. In this embodiment, such measurements may be acquired, for example, from the third node 906 or some other network node 916, such as a software defined networking (SDN) controller, network management or network orchestration entity.

The first node is then operative to send a signal 918 to a second node 904. The signal 918 comprises measurements of one or more network parameters for the first link and/or measurements of one or more network parameters for the second link. The measurements may reflect the current (e.g. real-time) conditions on the first and/or second links, 908, 910.

The second node 904 comprises a controller 920. The controller may comprise a processor such as processor 504 and memory such as memory 506 as was described with respect to second node 304 and FIG. 5 above. The second node may be operative to determine an indication of a performance associated with a first node sending traffic through an aggregation of a first link and a second link. For example, the second node 904 may determine the indication from the measurements of the one or more network parameters for the first link and/or the measurements of one or more network parameters for the second link and a database 922 stored on, or accessible by the second node 904. Database 922 may store one or more relationships between measured network parameters for the first and/or second links and (e.g. predicted) performances of aggregations of the first link and the second link. Such relationships were described in detail above with respect to first node 302 and second node 304 and the details therein will be understood to apply equally to the embodiment of FIG. 9.

Having determined the indication of a performance associated with a first node sending traffic through an aggregation of a first link and a second link, the second node 904 sends a signal 924 to the first node, based on the determined indication. As was described above with respect to step 804 of method 800, the signal 924 may comprise the indication and/or an instruction that instructs the first node 902 to send the traffic through one of: the first link, the second link, and an aggregation of the first link and the second link. If an instruction is included in signal 924 then the contents of the instruction is based on the indication. The details described above with respect to the signal in step 804 of method 800 will be understood to equally to the signal 924.

The controller 912 of the first node 902 receives the signal 924 from the second node. If the signal 924 comprises just the indication, the controller 912 of the first node determines whether to send the traffic through the first link 908, the second link 910, or an aggregation of the first and second links and sends the traffic through the appropriate links using a link selector 914. Criteria for determining the appropriate link through which to send traffic were described above in detail with respect to FIGS. 6 and 8 above and the details therein will be understood to apply to this aspect of the embodiment of FIG. 9.

If the signal 924 comprises an instruction of which link, or aggregation of links to use, then the controller 912 executes the instruction and sends the traffic through the instructed link, using the link selector 914.

In this way, the first node is able to dynamically schedule traffic through the first link, second link and an aggregation of the first and second links, in response to real-time network conditions, thereby attaining the best possible performance, given the measured network conditions.

Figure 10:
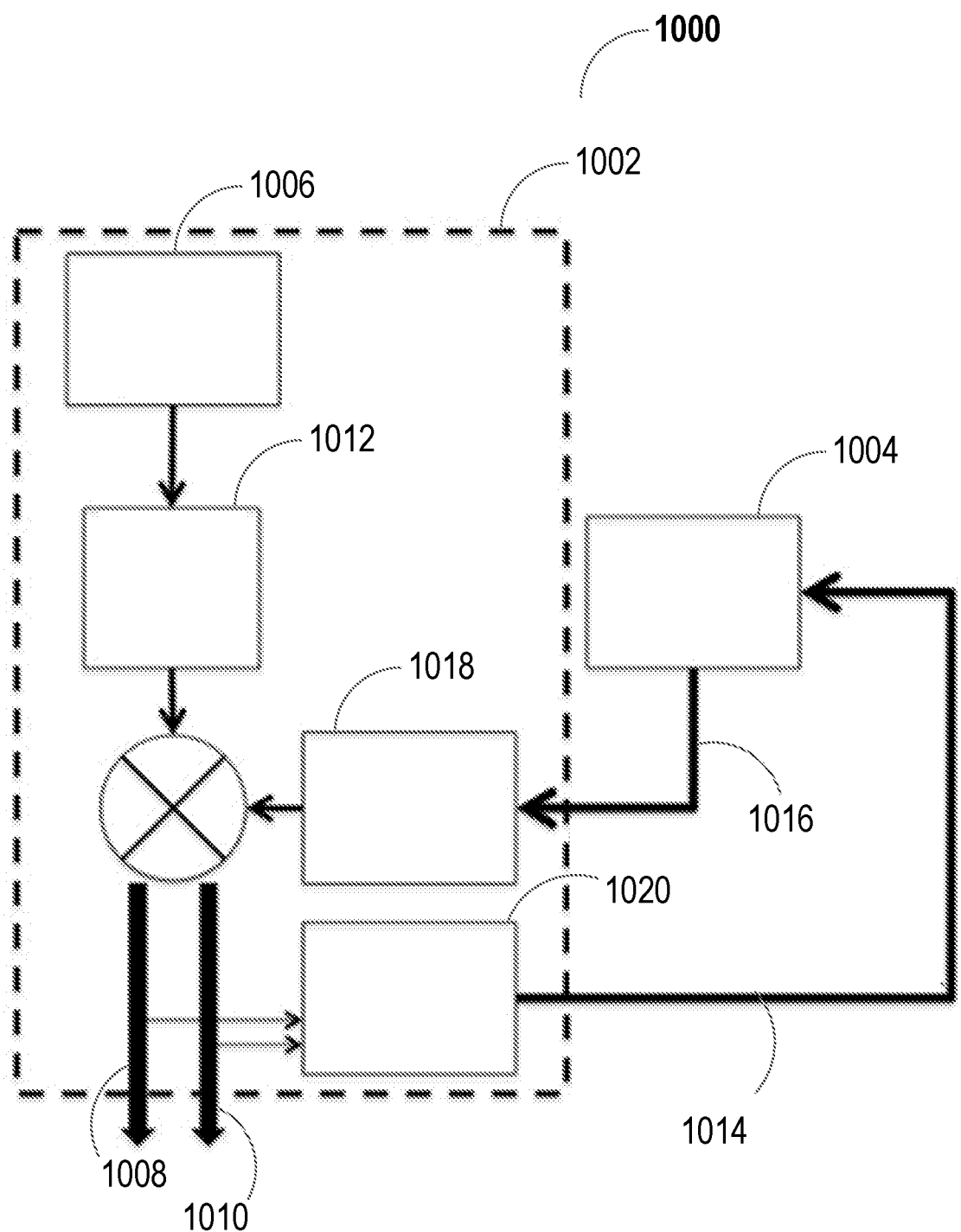
FIG. 10 shows a further example system according to an embodiment.

Turning now to FIG. 10, FIG. 10 illustrates an example system 1000 according to an embodiment. In this embodiment, system 1000 comprises a first node 1002 and a second node 1004. The first node comprises a receiver 1006 that receives data packets for transmission. The data packets (e.g. traffic) may be transmitted over a first link 1008, a second or subsequent link(s) 1010 an aggregation of any combination of the first link 1008 and the second or subsequent links 1010. As data packets arrive or are generated, they are transferred to a queue 1012 for transmission. In parallel, the first node 1002 is operative to make measurements of one or more network parameters relating to the links 1008, 1010 using a link evaluator 1020 and to send these measurements to the second node 1004 in a signal 1014. The second node 1004 is adapted to determine an indication of a performance associated with an aggregation of the first link 1008 and one or more of the second and subsequent links 1010 in response to receiving the measurements from the first node 1002. Details of the indication and the ways in which the second node may determine said indication were provided above with respect to methods 600 and 800 and the details therein will be understood to apply to system 1000.

The second node 1004 sends a signal 1016 to the first node 1002, the signal comprising the indication and/or an instruction to send the packet data through the first link, a second or subsequent link or an aggregation of one or more of the first and second or subsequent link(s). As noted above with respect to FIG. 9, if the signal 1016 comprises the indication, the first node will determine which link or aggregation of links each packet in the queue is to be sent through, based on the indication. If the signal 1016 comprises an instruction of which signal to use, then the first node 1002 will send the traffic through the instructed link or aggregation of links. In either scenario, the link or aggregation of links is sent to a link selector 1018 which then transmits the queued packets on the appropriate links. As noted above, measurements may be repeatedly sent to the second node 1004 (e.g. essentially in real time) and thus regular indications of performance may be determined and sent to the first node 1002. Thus, different link or link aggregation combinations may be used for each data packet, such that the highest performing link or aggregation of links is used for each transmission. In this way, traffic may be dynamically scheduled through a first, second and subsequent links in order to obtain, based on real-time network conditions, the highest performance at any given time.

Figure 11:
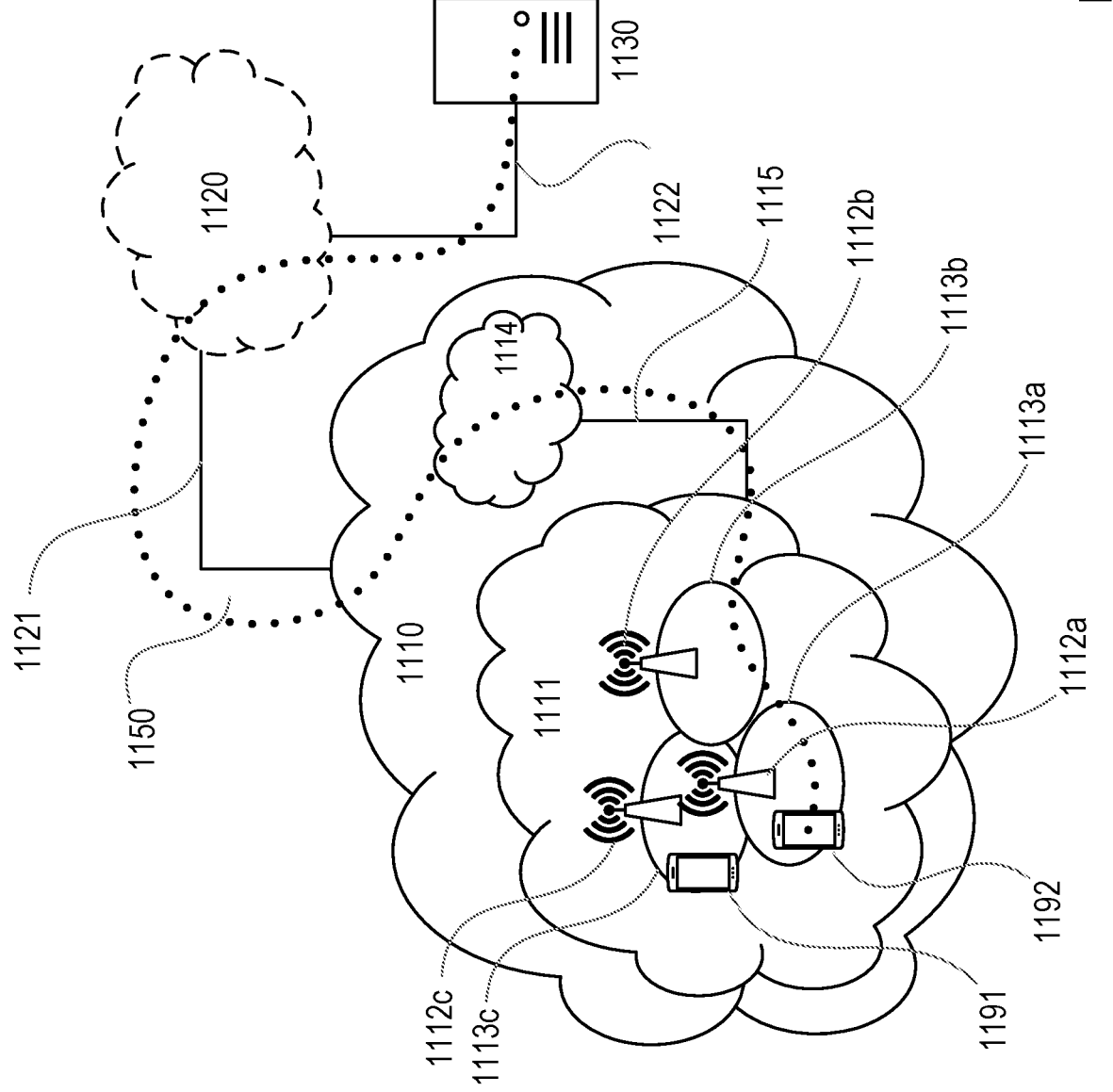
FIG. 11 shows an example communications system according to an embodiment.

Turning now to another aspect, with reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network;

intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. In the context of this disclosure, in some embodiments, the OTT connection 1150 (or part of the OTT connection 1150) may be provided by the first link, the second link and/or an aggregation of the first and second links. One or both of the first and second links may be provided by access network 1111. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Figure 12:
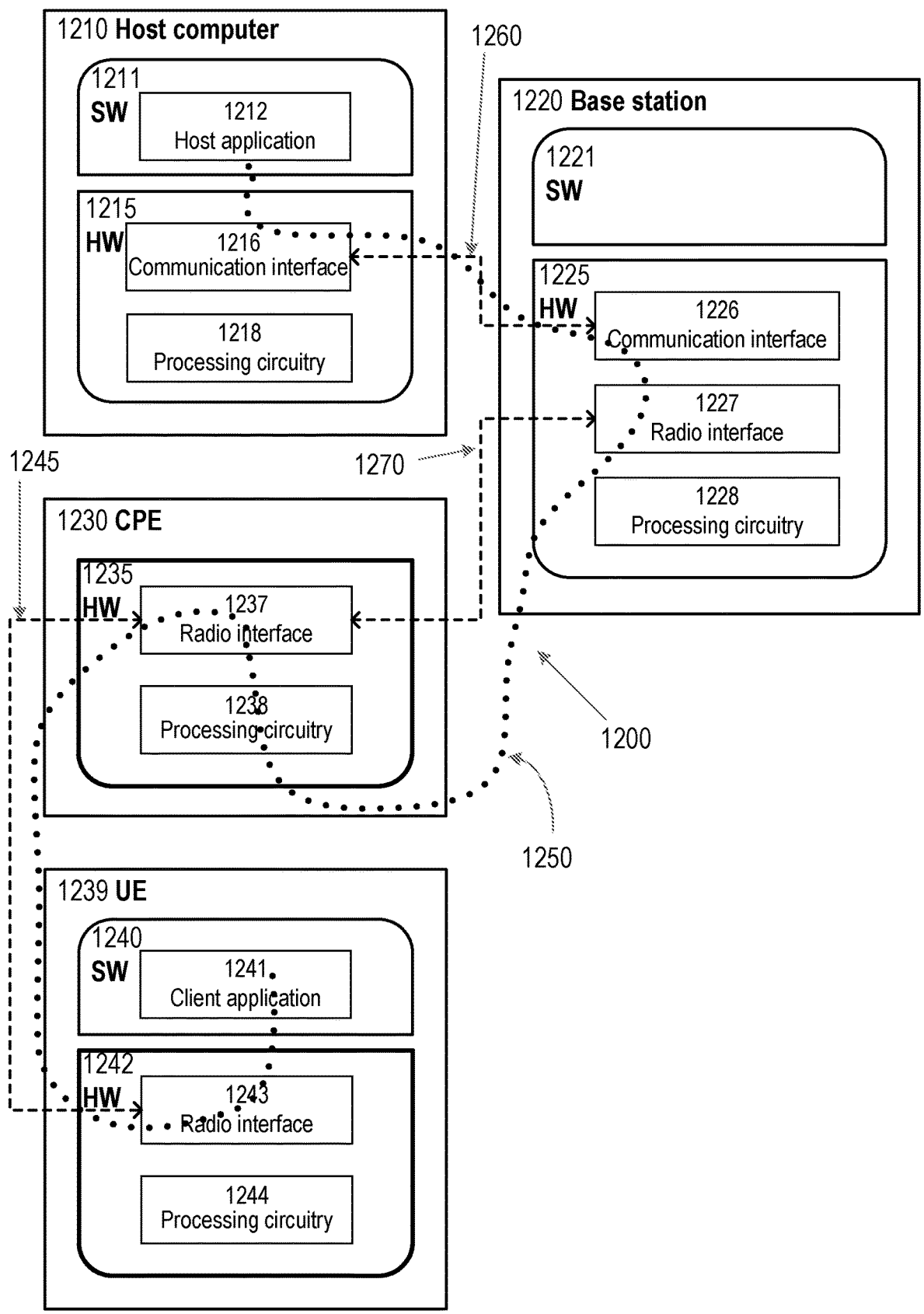
FIG. 12 shows a further example communications system according to an embodiment.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1239 connecting via OTT connection 1250 terminating at UE 1239 and host computer 1210. In providing the service to the remote user, host application 1212 may provide user data which may be transmitted using OTT connection 1250.

Communication system 1200 further includes base station 1220 provided in a telecommunication system and comprising hardware 1225 enabling it to communicate with host computer 1210 and with customer premises equipment CPE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with CPE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further comprises a CPE 1230 already referred to. CPE 1230 comprises hardware 1235 that may include a radio interface 1237 configured to set up and maintain a wireless connection 1270 with base station 1220. Radio interface 1237 may further be configured to set up and maintain a wireless connection 1245 with UE 1239. CPE 1230 may further comprise one or more additional interfaces (not illustrated) to enable CPE 1230 to set up connections with one or more other links (for example other wireless, or wired links). In the context of the disclosure here, the CPE is configured to send traffic across a first link, a second link and an aggregation of the first link and the second link. In some embodiments, the first link comprises wireless connection 1270. In some embodiments, the second link may comprise a wireless connection to another base station, similar to base station 1220. When the CPE sends traffic from UE 1239 through wireless connection 1270 to host computer 1210, the traffic is sent through OTT connection 1250.

Communication system 1200 further includes UE 1239 already referred to. UEs 1239 hardware 1242 may include radio interface 1243 configured to set up and maintain wireless connection 1245 with (CPE) 1230. Hardware 1242 of UE 1239 further includes processing circuitry 1244, which may comprise one or more programmable processors, application-specific integrated circuits, field programmable gate arrays or combinations of these (not shown) adapted to execute instructions. UE 1239 further comprises software 1240, which is stored in or accessible by UE 1239 and executable by processing circuitry 1244. Software 1240 includes client application 1241. Client application 1241 may be operable to provide a service to a human or non-human user via UE 1239, with the support of host computer 1210. In host computer 1210, an executing host application 1212 may communicate with the executing client application 1241 via OTT connection 1250 terminating at UE 1239 and host computer 1210. In providing the service to the user, client application 1241 may receive request data from host application 1212 and provide user data in response to the request data. OTT connection 1250 may transfer the request data. Client application 1241 may interact with the user to generate the user data that it provides.

User data may be transferred, via the CPE 1230 to the host application 1210. As noted above, the CPE 1230 can transfer traffic such as the user data through a first link (e.g. the connection 1270), or via a second link (not shown in FIG. 12). When CPE 1230 sends the traffic through the first link the traffic is sent from the UE to the host computer through OTT connection 1250. CPE 1230 is configured to acquire an indication of a performance associated with sending traffic through an aggregation of the first link (e.g. connection 1270 and thus OTT connection 1250) and the second link, and send the traffic through one of: the first link, the second link, and an aggregation of the first link and the second link, based on the indication.

Figure 13:
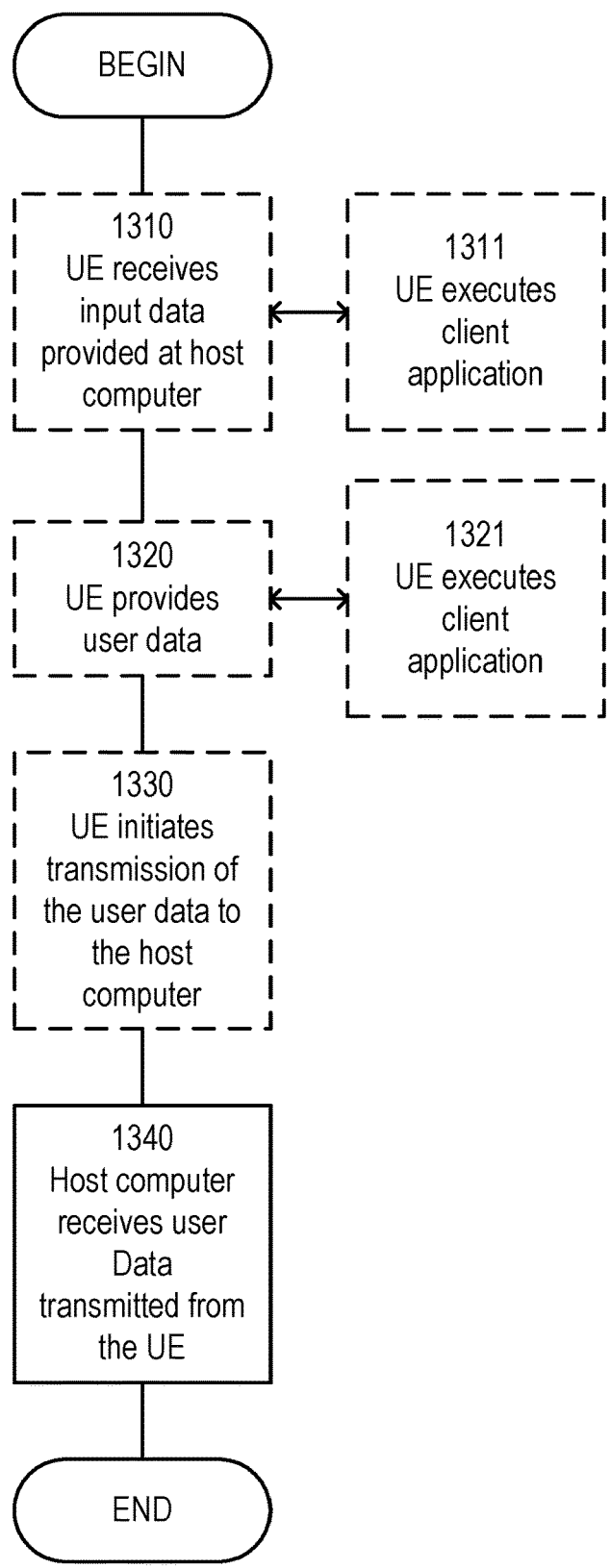
FIG. 13 shows an example method according to an embodiment.

FIG. 13 is a flowchart illustrating an example method implemented in a communication system. The communication system includes a host computer, a base station and a UE which may be those described with reference to FIGS. 12 and 13. For simplicity of the present disclosure, only drawing references to FIG. 13 will be included in this section. According to this embodiment, in step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330, transmission of the user data to the host computer.

According to embodiments herein, substep 1330 comprises the UE sending the user data to a CPE such as CPE 1230. Steps in the CPE comprise acquiring an indication of a performance associated with sending traffic through an aggregation of a first link and a second link, and sending the user data (e.g. traffic) through one of: the first link, the second link, and an aggregation of the first link and the second link, based on the indication. In this embodiment, the first link comprises telecommunications network 1110 of FIG. 11. The second link may comprise another telecommunications network, similar to the telecommunications network 1110 (e.g. owned by a different operator) or a different connection, such as a wifi or wired connection. The steps of acquiring and sending are in accordance with the teachings of the embodiments described throughout this disclosure, for example, steps of acquiring 602 and sending 604 were described above with reference to FIG. 600 and the details therein will be understood to apply to step 1330 here.

In step 1340 of the method, the host computer receives the user data transmitted from the UE, via the first link, the second link, or an aggregation of the first and second links.

Figure 14:
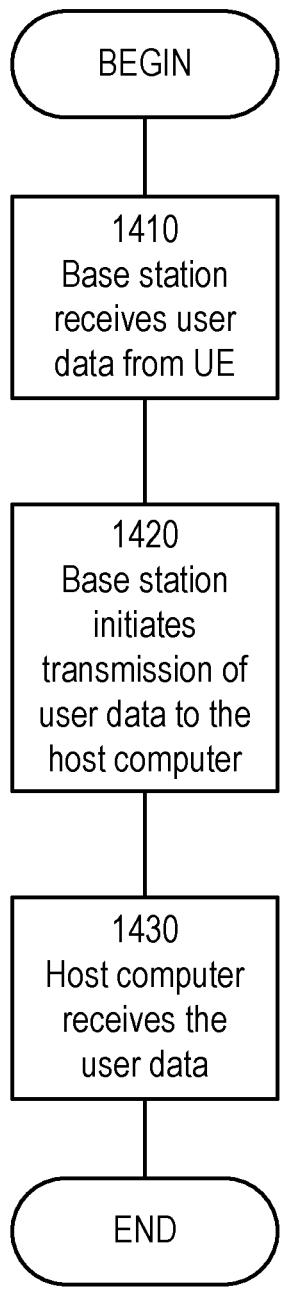
FIG. 14 shows a further example method according to an embodiment.

FIG. 14 is a flowchart illustrating a method implemented in a communication system, in accordance with one embodiment. The communication system includes a host computer, a base station and a UE which may be those described with reference to FIGS. 11 and 12. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In this way, the sending of the user data may benefit from the increased performance gained by choosing a link or combination of links with the best performance.

The invention claimed is:

1. A first node for use in a telecommunications network, wherein the first node sends traffic to a receiving node through a first link, a second link, or aggregation of the first link and the second link, the first node comprising:
    a processor; and
    a memory containing instructions which, when executed by the processor, cause the first node to operate to:
        acquire an indication of a performance associated with sending the traffic through the first link and performance associated with sending the traffic through aggregation of the first link and the second link;
        in response to acquiring the indication, determine that the performance associated with sending the traffic through the aggregation of the first link and the second link is less than the performance associated with sending the traffic through the first link; and
        in response to the determination that the performance associated with sending the traffic through the aggregation of the first link and the second link is less than the performance associated with sending the traffic through the first link, send the traffic through the first link, instead of
        the aggregation of the first link and the second link.

2. The first node as in claim 1, wherein the indication further indicates performance associated with sending the traffic through the second link.

3. The first node as in claim 2, wherein the first node is to send the traffic through the aggregation of the first link and the second link when the performance associated with sending the traffic through the first link and the performance associated with sending the traffic through the second link are each individually less than the performance associated with sending traffic through the aggregation of the first link and the second link.

4. The first node as in claim 2, wherein the indication is based on one or more relationships between network parameters for the first link, network parameters for the second link and the performance associated with sending the traffic through the aggregation of the first link and the second link.

5. The first node as in claim 1, wherein the indication further indicates a performance associated with sending the traffic through an aggregation of the first link, the second link and one or more further links for sending the traffic through
    the aggregation of the first link, the second link and the one or more further links.

6. The first node as in claim 2 wherein, the first node is to acquire an the indication by performing operations to:
    receive a signal comprising the indication from a second node.

7. The first node as in claim 6 wherein the first node is to acquire an indication by performing further operations to:
    send measurements of one or more network parameters for the first link, measurements of one or more network parameters for the second link, or measurements of one or more network parameters for both the first link and the second link, to the second node; and
    receive the indication from the second node in response to sending of the measurements.

8. The first node as in claim 2, wherein the first node further performs operations to:
    acquire measurements of one or more network parameters for the first link and
        measurements of one or more network parameters for the second link; and
    determine the performance associated with sending traffic through the aggregation of the
        first link and the second link based on:
        the measurements of the one or more network parameters for the first link;
        the measurements of the one or more network parameters for the second link; or
        one or more relationships between network parameters for the first link, network
            parameters for the second link and the performance associated with sending traffic through the aggregation of the first link and the second link; or
        any combination thereof.

9. The first node as in claim 8, wherein the one or more network parameters for the first link, the one or more network parameters for the second link, or both the one or more network parameters for the first link and the one or more network parameters for the second link, comprise one or more network conditions, one or more service requirements, or both one or more network conditions and one or more service requirements.

10. A method in a first node for use in a telecommunications network,
wherein the first node sends traffic to a receiving node through a first link, a second link, or
aggregation of the first link and the second link, the method comprising:
acquiring an indication of a performance associated with sending the traffic through the first link and performance associated with sending the traffic through aggregation of the first link and the second link;
in response to acquiring the indication, determining that the performance associated with sending the traffic through the aggregation of the first link and the second link is less than the performance associated with sending the traffic through the first link; and
in response to the determining that the performance associated with sending the traffic through the aggregation of the first link and the second link is less than the performance associated with sending the traffic through the first link, sending the traffic through the first link, instead of
the aggregation of the first link and the second link.

11. The method as in claim 10, wherein the indication further indicates performance associated with sending the traffic through the second link.

12. The method as in claim 11, further comprising sending the traffic through the aggregation of the first link and the second link when the performance of associated with sending the traffic through the first link and the performance associated with sending the traffic through the second link are each individually less than the performance associated with sending the traffic through the aggregation of the first link and the second link.

13. The method as in claim 11, wherein the indication is based on one or more relationships between network parameters for the first link, network parameters for the second link and the performance associated with sending the traffic through the aggregation of the first link and the second link.

14. The method as in claim 10, wherein the indication further indicates a performance associated with sending the traffic through an aggregation of the first link, the second link and one or more further links for sending the traffic through
the aggregation of the first link, the second link and the one or more further links.

15. The method as in claim 11, wherein the acquiring comprises:
receiving a signal comprising the indication from a second node.

16. The method as in claim 15 wherein the acquiring further comprises:
sending measurements of one or more network parameters for the first link,
measurements of one or more network parameters for the second link, or
measurements of one or more network parameters for both the first link and the second link, to the second node; and
receiving the indication from the second node in response to sending of the measurements.

17. The method as in claim 11, further comprising:
acquiring measurements of one or more network parameters for the first link and measurements of one or more network parameters for the second link; and
determining the performance associated with sending traffic through the aggregation of the first link and the second link based on:
the measurements of the one or more network parameters for the first link;
the measurements of the one or more network parameters for the second link; or
one or more relationships between network parameters for the first link, network
parameters for the second link and the performance associated with sending the traffic through the aggregation of the first link and the second link; or any combination thereof.

18. The method as in claim 17, wherein the one or more network parameters for the first link, the one or more network parameters for the second link, or both the one or more network parameters for the first link and the one or more network parameters for the second link, comprise one or more network conditions, one or more service requirements, or both one or more network conditions and one or more service requirements.

* * * * *